US011056821B2

(12) United States Patent
Ferderer et al.

(10) Patent No.: US 11,056,821 B2
(45) Date of Patent: Jul. 6, 2021

(54) MODULE SYSTEM FOR MODULAR PLUG CONNECTORS

(71) Applicant: HARTING Electric GmbH & Co. KG, Espelkamp (DE)

(72) Inventors: Albert Ferderer, Espelkamp (DE); Heiko Meier, Minden (DE)

(73) Assignee: HARTING Electric GmbH & Co. KG, Espelkamp (DE)

( * ) Notice: Subject to any disclaimer, the term of this patent is extended or adjusted under 35 U.S.C. 154(b) by 69 days.

(21) Appl. No.: 16/081,770

(22) PCT Filed: Jan. 3, 2017

(86) PCT No.: PCT/EP2017/050051
§ 371 (c)(1),
(2) Date: Aug. 31, 2018

(87) PCT Pub. No.: WO2017/148598
PCT Pub. Date: Sep. 8, 2017

(65) Prior Publication Data
US 2020/0169030 A1 May 28, 2020

(30) Foreign Application Priority Data

Mar. 3, 2016 (DE) .................. 10 2016 203 483.9

(51) Int. Cl.
*H01R 13/514* (2006.01)
*H01R 27/02* (2006.01)
(52) U.S. Cl.
CPC .......... *H01R 13/514* (2013.01); *H01R 27/02* (2013.01)
(58) Field of Classification Search
CPC .............. H01R 12/70; H01R 12/7005; H01R 12/7011; H01R 12/7064; H01R 13/40;
(Continued)

(56) References Cited

U.S. PATENT DOCUMENTS 5,643,016 A * 7/1997 Huss, Jr. .............. H01R 13/434
439/689
5,934,945 A * 8/1999 Petersen .............. H01R 13/426
439/744
(Continued)

FOREIGN PATENT DOCUMENTS

DE 197 07 120 C1 6/1998
EP 0 847 107 A1 6/1998
(Continued)

OTHER PUBLICATIONS

Korean Office Action, dated Jul. 12, 2019, for Korean Application No. 10-2018-7027997, 8 pages. (With English translation.).
(Continued)

*Primary Examiner* — Edwin A. Leon
*Assistant Examiner* — Matthew T Dzierzynski
(74) *Attorney, Agent, or Firm* — Seed IP Law Group LLP

(57) ABSTRACT

The present disclosure relates to the field of modular plug connectors and in particular to a configuration in which different types of contacts are combined in a modular plug connector. To present a solution with which it is possible to combine different types of contacts in a space-saving manner, a module system for a modular plug connector comprising a module block to be received in the modular plug connector is proposed, wherein the module block is designed with a plurality of contact receptacles which are each provided to receive a contact of a first type, and an adaptation component which is designed to be received in one of the contact receptacles of the module block, wherein the adaptation component is provided to receive a contact of a second type, and wherein the contact of the second type has a smaller cross-section than the contact of the first type.

11 Claims, 4 Drawing Sheets

(58) Field of Classification Search
CPC .............. H01R 13/428; H01R 13/4226; H01R 13/4223; H01R 13/62; H01R 13/627
See application file for complete search history.

(56) References Cited

U.S. PATENT DOCUMENTS

| | | | |
|---|---|---|---|
| 6,004,162 A | 12/1999 | Harting et al. | |
| 6,354,869 B1* | 3/2002 | Cranston, III | G06F 1/184 439/544 |
| 6,386,913 B1* | 5/2002 | Mohammad | H01R 24/50 439/579 |
| 6,746,284 B1* | 6/2004 | Spink, Jr. | H01R 13/115 439/651 |
| 6,752,667 B2* | 6/2004 | Ferderer | H01R 4/5016 439/729 |
| 7,249,980 B2* | 7/2007 | Ferderer | H01R 4/5033 439/729 |
| 7,322,842 B2 | 1/2008 | Dück et al. | |
| 7,419,401 B2* | 9/2008 | Ferderer | H01R 4/48 439/441 |
| 7,736,199 B2* | 6/2010 | Cossette | H01R 13/426 439/745 |
| 8,029,324 B1* | 10/2011 | Yi | H01R 13/4367 439/745 |
| 8,029,325 B2 | 10/2011 | Bardet | |
| 8,052,447 B2* | 11/2011 | Feye-Hohmann | H01R 4/4836 439/268 |
| 8,075,322 B2* | 12/2011 | Schwettmann | H01R 12/7011 439/82 |
| 8,177,572 B2* | 5/2012 | Feye-Hohmann | H01R 4/4836 439/268 |
| 9,437,977 B1* | 9/2016 | Belack | H01R 13/648 |
| 9,559,452 B1* | 1/2017 | Mugan | H01R 13/422 |
| 9,608,374 B2* | 3/2017 | Beischer | H01R 13/514 |
| 9,880,357 B2* | 1/2018 | Drescher | G02B 6/32 |
| 10,050,391 B2* | 8/2018 | Herbrechtsmeier | H01R 13/514 |
| 10,418,773 B2* | 9/2019 | Herbrechtsmeier | H01R 43/20 |
| 10,424,892 B2* | 9/2019 | Herbrechtsmeier | H01R 43/20 |
| 10,439,300 B1* | 10/2019 | Ferderer | H01R 4/4836 |
| 10,559,911 B2* | 2/2020 | Herbrechtsmeier | H01R 4/48 |
| 10,559,913 B2* | 2/2020 | Schonfeld | H01R 13/514 |
| 2003/0104732 A1* | 6/2003 | Ferderer | H01R 4/4818 439/863 |
| 2010/0029143 A1 | 2/2010 | Cossette | |

FOREIGN PATENT DOCUMENTS

| | | |
|---|---|---|
| EP | 1 180 817 A2 | 2/2002 |
| EP | 1 353 412 A2 | 10/2003 |
| JP | 7-282880 A | 10/1995 |

OTHER PUBLICATIONS

German Office Action, dated Jan. 31, 2017, for German Application No. 10 2016 203 483.9, 5 pages.
International Preliminary Report on Patentability, dated Sep. 4, 2018, for International Application No. PCT/EP2017/050051, 13 pages. (with English Translation).
Written Opinion of the International Searching Authority, dated Mar. 13, 2017, for International Application No. PCT/EP2017/050051, 5 pages. (English Translation).
Harting Elektronik GmbH, "Schwere Steckverbinder Han-Modular®," Product Catalog, Jan. 1999, 44 pages.
International Search Report and Written Opinion, dated Mar. 13, 2017, for International Application No. PCT/EP2017/050051, 11 pages. (with English Translation of Search Report).

* cited by examiner

MODULE SYSTEM FOR MODULAR PLUG CONNECTORS

BACKGROUND

Technical Field

The present disclosure relates to the field of modular plug connectors and in particular to a configuration in which different types of contacts are combined in a modular plug connector.

Description of the Related Art

A modular plug connector which can use, for example, a holding frame for holding plug connection modules as described in DE 197 07 120 C1, is described, for example, in EP 1 353 412 A2.

That different kinds of modules can be combined, for example to transmit electrical, optical and/or pneumatic signals, is already described in EP 1 353 412 A2.

Prior art modules and module blocks are each configured for a predefined type of contact. In that respect, there are design and functional reasons why a pneumatic contact, for example, is larger in its dimensions (not only in length, but above all in cross-section) than a typical electrical contact, for example.

The consequence is that, in a module block designed either for electrical contacts or pneumatic contacts, either only such electrical contacts or only such pneumatic contacts can be used in the prior art. Pneumatic contacts, which have a larger cross-section, are simply too large for a module block provided for electrical contacts, while electrical contacts are too small to be used in a module block that is actually designed for pneumatic contacts.

If there is enough space in a plug connector to provide separate module blocks, e.g., for electrical and pneumatic contacts, the contacts can each be accommodated in the different module blocks. In many cases, however, there are not enough unused places for contacts, which then becomes a problem when space becomes scarce in a plug connector, i.e., when a large number of contacts are combined with each other.

BRIEF SUMMARY

Embodiments of the present invention overcome this limitation in the prior art and present a solution with which it is possible to combine different types of contacts in a space-saving manner.

According to a first aspect of the invention, a module system for a modular plug connector is provided, comprising a module block to be received in the modular plug connector, wherein the module block is designed with a plurality of contact receptacles which are each provided to receive a contact of a first type, and an adaptation component which is designed to be received in one of the contact receptacles of the module block, wherein the adaptation component is provided to receive a contact of a second type, and wherein the contact of the second type has a smaller cross-section than the contact of the first type.

The module system according to this first aspect of the invention can also be described as a module system comprising a module block to be received in a modular plug connector and an adaptation component to be received in the module block, wherein the module block has a plurality of contact receptacles. The adaptation component is designed to be received in one of the contact receptacles, wherein the contact receptacles each have a first cross-section and are selectively designed to receive a contact of a first type or to receive an adaptation component. The adaptation component, for its part, has a receptacle for a contact of a second type, which has a second cross-section. The second cross-section is smaller than the first cross-section.

According to a second aspect of the invention, an adaptation component for a module system for a modular plug connector is provided, wherein the adaptation component is designed to be received in a contact receptacle of a module block of the module system, which is provided to receive a contact of a first type, wherein the adaptation component is also provided to receive a contact of a second type and wherein the contact of the second type has a smaller cross-section than the contact of the first type.

According to another aspect of the invention, a method of preparing a modular plug connector is proposed, namely a method comprising: providing a module block, wherein the module block is designed with a plurality of contact receptacles, each of which is provided to receive a contact of a first type, inserting a contact of the first type into one of the contact receptacles of the module block, inserting a contact of a second type into an adaptation component, wherein the contact of the second type has a smaller cross-section than the contact of the first type, inserting the adaptation component into another one of the contact receptacles of the module block, and inserting the module block into the modular plug connector.

It should be noted here that this aspect of the invention is not limited to any particular sequence of the aforementioned steps, unless such a sequence ensues from the nature of the steps themselves. The adaptation component is preferably populated with the contact of the second type, however, so the adaptation component is inserted into the one other contact receptacle with the contact of the second type inserted into the adaptation component. Furthermore, the module block is preferably populated with the contacts (directly in the case of contacts of the first type and indirectly in the case of contacts of the second type) when it is inserted into the plug connector.

Part of the background to the present disclosure can be found in the following considerations.

One possible way of providing contacts of different types in a module block may consist in providing module blocks that are different from the standardized module blocks having receptacles for only type of contact (or size of contact), and in which receptacles for contacts of different types and/or sizes are already provided. The disadvantage of this approach, however, is that a large number of different module blocks would have to be kept available in order to cover the conceivable ways of combining the different types of contacts.

The module system according to one or more embodiments of the present invention allows a modified module block to be prepared in a targeted manner, but without such complex variations due to combining a module block (in particular a standardized one) with one (or more) adaptation components. This modified module block is like a prefabricated module block having different receptacles for different types of contact, but without the disadvantages of having to keep different such module blocks, and their lack of flexibility, arising.

In an advantageous embodiment of one aspect of the invention, the contact of the first type is a pneumatic contact, in which case the contact of the second type can then be an electrical and/or an optical contact. Electrical, optical and pneumatic contacts are types of contacts that can be combined in a particularly favorable manner in the context of embodiments of the present invention.

In another advantageous embodiment of one aspect of the invention, the contact of the first type is an electrical contact, which differs from a contact of the second type that is likewise electrical, for example, above all in that said electrical contact of the first type is intended for transmission of a (much) greater level of electrical power in comparison with the contact of the second type and in that respect has a larger cross-section. With such a configuration, it is possible, in particular, for stronger currents to be transferred in combination with (low-power) signals in one module block.

In another advantageous embodiment of one aspect of the invention, the adaptation component is a sleeve having an inner contour and an outer contour, wherein the inner contour is designed to fixate the contact of the second type in the adaptation component and the outer contour is designed to fixate the adaptation component in one of the contact receptacles of the module block. However, the expression "sleeve" is not to be understood in this case as being limited to a cylinder or to a substantially cylindrical element and refers to the fact that the adaptation component has an adapted inner contour and adapted outer contour, wherein both the inner contour and the outer contour may be provided with recesses, spaces, slots, holes and the like. The adaptation component in the form of a sleeve allows the contact of the second type to extend at least partially through the adaptation component and/or to be received in the adaptation component in such a way that it is possible for it to come directly into contact with a contact in the mating plug.

In an advantageous embodiment of one aspect of the invention, alternative to the one above, the adaptation component is designed for contacting the contact of the second type and for contacting a mating connector of the modular plug connector. Unlike in the embodiment of the adaptation component in the form of a sleeve, the adaptation component in this embodiment is itself part of the (through) connection, the adaptation component itself producing a contact between the contact of the second type and the mating connector. For example, the adaptation component may have an electrically conductive portion which in the installed state is in conductive contact with both the contact (of the second type), which is electrical in that case, and also with the mating connector.

In another advantageous embodiment of one aspect of the invention, the adaptation component is designed for releasably fixating the adaptation component in a contact receptacle of the module block. Although an aspect of the invention also entails that once a contact element has been inserted into a contact receptacle of the module block, it can no longer be removed from the module block or the adaptation component without destroying it, for example because it snaps or latches into place, it is advantageous to provide releasable fixation. For example, if an adaptation component is mistakenly inserted into the wrong contact receptacle during assembly, this can be easily corrected.

In a particularly advantageous variant of the above embodiment, releasing the fixated adaptation component from the contact receptacle includes deforming the adaptation component, which is blocked by a contact of the second type which has been received in the adaptation component. The releasable fixation of the adaptation component can be achieved, for example, by one or more elastically deformable tongues or similar portions of the adaptation component forming a form fit with the module block, wherein the form fit can be removed by deforming the tongue(s) or similar portions. If a second contact is received in the adaptation component, the presence of the contact prevents any deformation, so the form fit is kept, with the result that the adaptation component remains fixated.

An embodiment of the invention also provides a modular plug connector comprising the module system, a contact of the first type and a contact of the second type, wherein the contact of the first type is received in a contact receptacle of the module block, wherein the adaptation component is received in another contact receptacle of the module block and wherein the contact of the second type is received in the adaptation component.

An embodiment of the invention also provides a method of producing contact, comprising: preparing a first and a second modular plug connector, in each case according to aspects of the method of preparing a modular plug connector, and connecting the first and second plug connectors with respective contacting of the contact of the first type with each other and the contacts of the second type with each other.

Features of advantageous embodiments of the invention are defined in the dependent claims, in particular, and a person skilled in the art can also find other advantageous features, embodiments and variants of the invention in the above description and the discussion below.

BRIEF DESCRIPTION OF THE SEVERAL VIEWS OF THE DRAWINGS

In the following, the present invention shall be illustrated and described with reference to the embodiments shown in the Figures, in which.

In the enclosed drawings and in the associated descriptions of said drawings, corresponding or related elements are given corresponding or similar reference signs, where expedient, even when they are to be found in different views or descriptions.

DETAILED DESCRIPTION

Figure 1:
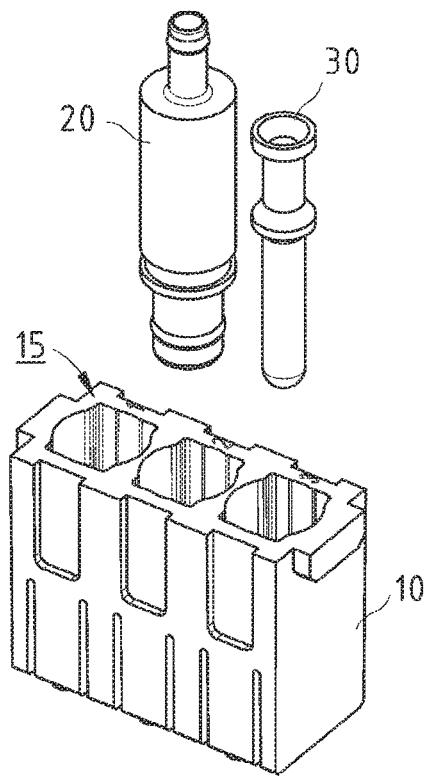
FIG. 1 shows a perspective view of a module block having a first type of contact and a second type of contact.

FIG. 1 shows a perspective view of a module block 10 having a contact 20 of a first type and a contact 30 of a second type.

Module block 10, which is known per se, has three contact receptacles 15 in this case, each of which is provided to receive a contact 20 of the first type. In this specific case, contact 20 of the first type is a pneumatic contact, which is larger in cross-section than the contact 30 of the second type, which in this case is an electrical contact.

As electrical contact 30 is smaller in cross-section than pneumatic contact 20, electrical contact 30 cannot be received securely in module block 10.

Figure 2:
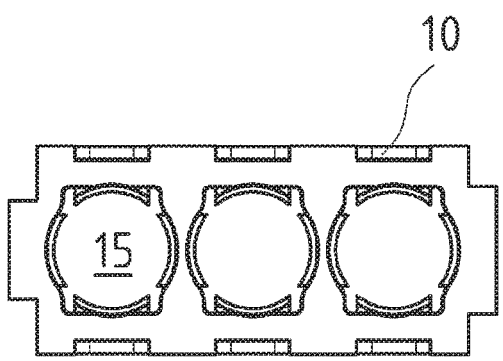
FIG. 2 shows a view onto the module block in FIG. 1, along a mating direction of the contacts.

FIG. 2 shows a top view onto module block 10 in FIG. 1, along a mating direction of contacts 20, 30. As can be seen from FIG. 2, the respective contact receptacle 15 extends through the entire module block 10, so a contact inserted in module block 10 can make contact on the opposite side (at the bottom in the view shown in FIG. 1) with a contact of an opposite module block (see FIG. 6).

Figure 3:
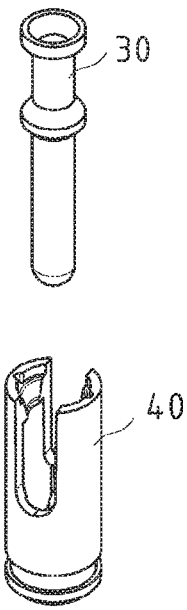
FIG. 3 shows a perspective view exploded view of an embodiment of a module system according to the invention, having a second type of contact.
Figure 3:
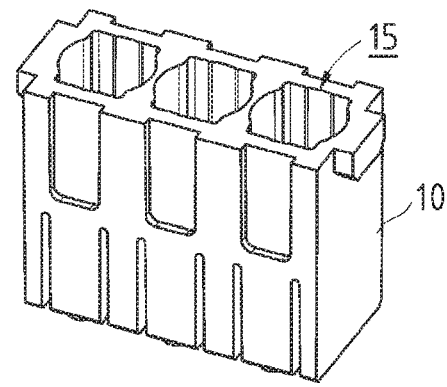

FIG. 3 shows a perspective exploded view of an embodiment of a module system according to the invention, having a contact 30 of a second type.

The module system comprises module block 10, which has already been described with reference to FIGS. 1 and 2, and an adaptation component 40 is also provided which is designed in the shape of a sleeve such that adaptation component 40 can be securely received in a contact receptacle 15 of module block 10, adaptation component 40 being provided to receive contact 30 of the second type inside its sleeve.

Figure 4:
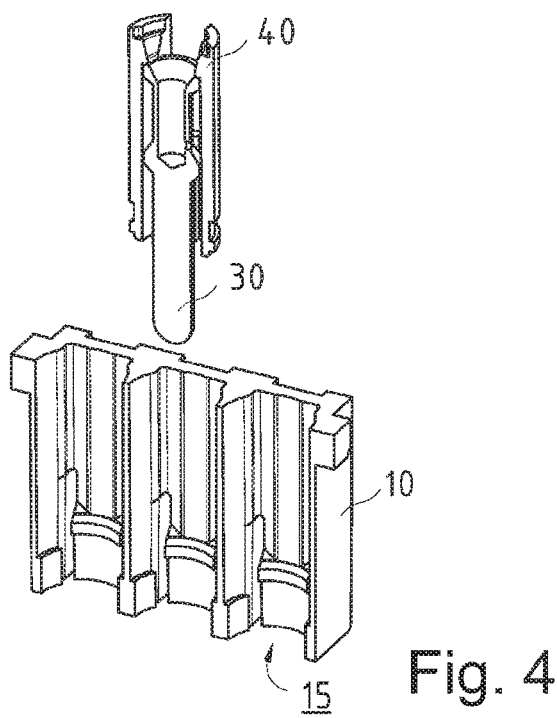
FIG. 4 shows a partly perspective cross-sectional view of the module system in FIG. 3, with the contact of the second type being inserted into an adaptation component.

FIG. 4 shows a partly perspective cross-sectional view of the module system in FIG. 3, with contact 30 of the first type inserted inside the adaptation component.

Figure 5:
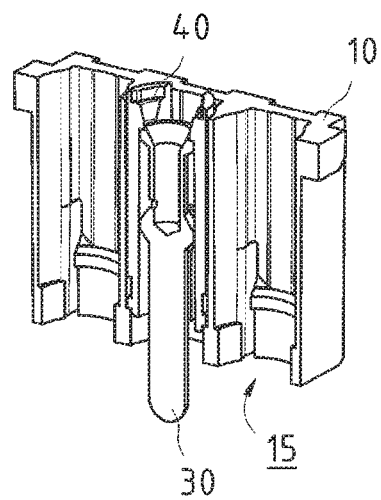
FIG. 5 shows a partly perspective cross-sectional view of the module system in FIG. 3 and FIG. 4, in which the adaptation component with the contact of the second type is now inserted in the module block.

FIG. 5 shows a partly perspective cross-sectional view of the module system in FIG. 3 and FIG. 4, in which adaptation component 40 with contact 30 of the second type is now inserted in the module block.

Figure 6:
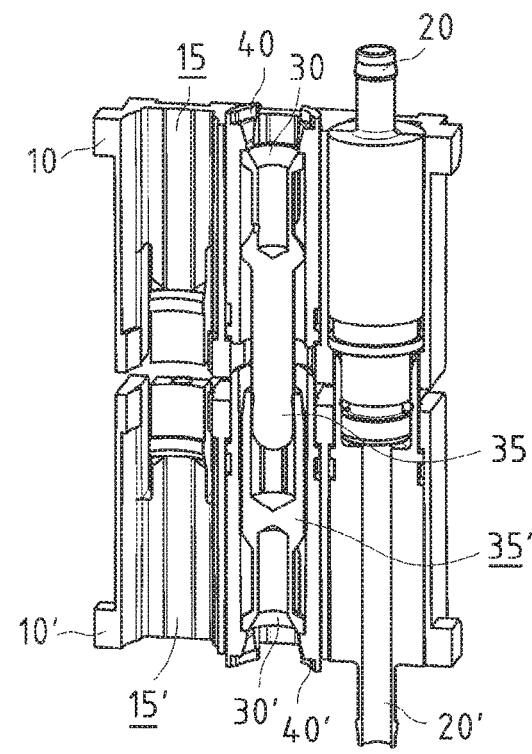
FIG. 6 shows a partly perspective cross-sectional view of a plug combination of two module systems according to the embodiment of the invention, with inserted adaptation components and contacts of the first and second type.

Adaptation component 40 is located in a contact receptacle 15 of module block 10, with contact receptacle 15 being provided in a known manner with a spatial design which allows a contact of the first type to be received securely (see FIG. 1 or FIG. 6). The outer shape of adaptation component 40 is so designed that it cooperates with the spatial design of contact receptacle 15 so that adaptation component 40 is securely received in module block 10.

Contact 30 of the second type also has a spatial design which is alternatively provided so that contact 30 of the second type can be received in a matching contact receptacle of a different module block adapted for the contact of the second type. In the present case, the shape of contact 30 of the second type interacts with an inner contour of adaptation component 40 to fixate contact 30 of the second type inside adaptation component 40.

FIG. 6 shows a partly perspective cross-sectional view of a plug combination of two module systems according to the embodiment of the invention, with inserted adaptation components 40, 40' and contacts 20, 20', 30, 30' of the first and second type.

In FIG. 6, in addition to what is shown in FIG. 5, a contact 20 of the second type (not shown in cross-section here) is received in one of the outer contact receptacles 15 of module block 10, in addition to adaptation component 40 provided in the middle contact receptacle 15 of module block 10, with a contact 30 of the second kind accommodated therein.

A pneumatic pin contact 20 is accommodated in the right-hand contact receptacle 15 of module block 10 in the view shown in FIG. 6. Contact 30 of the second type, which is accommodated in adaptation component 40, is an electrical pin contact having a pin section 35 at its front end (at its bottom end in the view shown in FIG. 6).

Module block 10' is correspondingly provided with a pneumatic socket contact 20' in its right-hand contact receptacle 15' and with an adaptation component 40' in the middle contact receptacle 15', with an electrical socket contact 30' accommodated therein. On its front side (at the top in FIG. 6), electrical socket contact 30' has a recess or a socket section 35', in which the pin section 35 of electrical pin contact 30 extends, such that the electrical contacts are connected to each other. Pneumatic pin contact 20 and pneumatic socket contact 20' are likewise connected to each other in a known manner.

It can be seen from the view shown in FIG. 6 that adaptation component 40 and adaptation component 40' differ in length, for example, although identical adaptation components may also be used for both contacting sides, according to an embodiment of the invention.

For the sake of clarity, no other module blocks and no other elements of the modular plug connectors are shown in FIG. 6.

In the embodiment discussed here, the contact of the first type is a pneumatic contact, while the contact of the second type is assumed here by way of example to be an electrical contact. However, embodiments of the invention are not limited to that combination, and all types of contact and transmission can basically be used (in particular pneumatic, fluidic, electrical or optical types) for a contact of the first type and for a contact of the second type. In this way, it is also possible for both contacts, for example, namely the contact of the first type and the contact of the second type, to be an electrical contact, and for the electrical contact of the first type to differ specifically from the electrical contact of the second type in that its cross-section is larger and that the electrical contact of the first type can thus transfer greater currents or power levels in comparison to the electrical contact of the second type.

Figure 7:
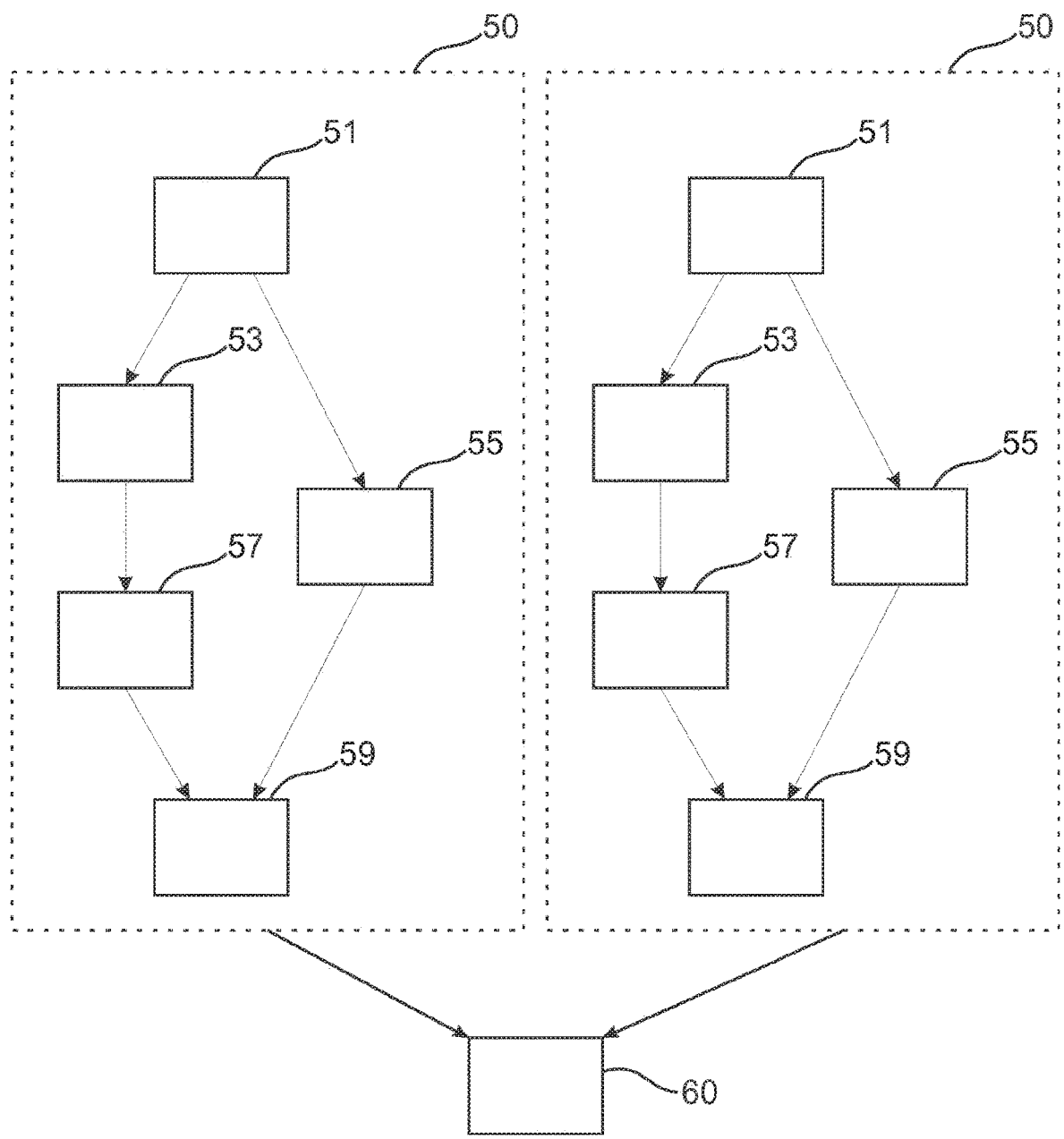
FIG. 7 shows a schematic flow diagram of an embodiment of the method of preparing mixed contact according to the invention.
Figure 8:
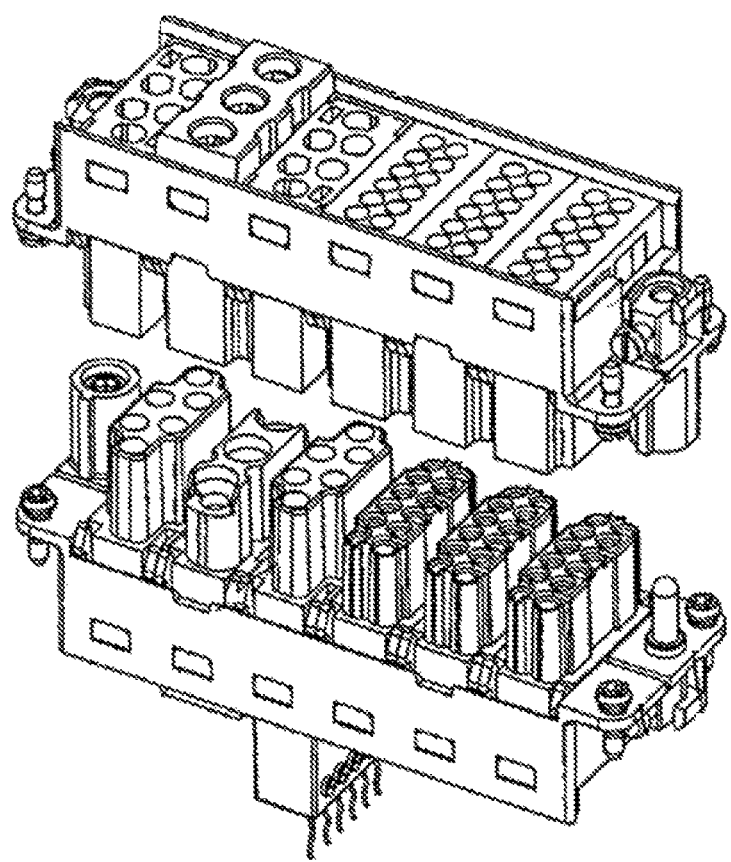
FIG. 8 shows a modular plug system having mating plug connectors loaded with respective module blocks.

FIG. 7 shows a schematic flow diagram of an embodiment of the method of preparing mixed contact according to the invention.

The method comprises the parallel steps of providing 50 a first modular plug connector and providing 50' a second modular plug connector, the respective providing steps 50, 50' match each other.

In a first step 51, a module block is provided, said module block having a plurality of contact receptacles, each single one of which is provided to receive a contact of a first type or an adaptation component. In insertion step 53 which then follows, a contact of the second type is inserted into the adaptation component. Parallel to that, in a further insertion step 55, a contact of the first type is inserted into one of the contact receptacles of the module block. Following insertion 53 of the contact of the second type into the adaptation component, the adaptation component (or rather the combination of adaptation component and a contact of the second type) is inserted into another of the contact receptacles of the module block (step 57), said contact of the second type differing from a contact of the first type substantially by having a smaller cross-section.

Instead of the sequence described here, it is also possible for the contact of the second type to be inserted into the adaptation component after the adaptation component (still without the contact of the second type) has been inserted into one of the contact receptacles of the module block.

After the module block has thus been provided with at least one contact of the first type and one contact of the second type, the module block is inserted in a further insertion step 59 into the modular plug connector.

Provided it is structurally feasible, this exact sequence of steps does not necessarily have to be adhered to, according to embodiments of the invention, because it may be possible for the module block to be inserted into the plug connector first of all, before it is then populated with the contacts.

Following the step of providing the first and second modular plug connectors in steps 50 and 50', the plug connectors are joined together in step 60, with the contacts of the first type contacting each other and the contacts of the second type contacting each other.

Even if different aspects or features of the invention are shown in combination in the Figures, it is clear to a person skilled in the art, unless otherwise specified, that the combinations shown and discussed are not the only ones possible.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A module system for a modular plug connector, comprising:
    a module block to be received in the modular plug connector, wherein the module block is designed with a plurality of contact receptacles which are each provided to insertably receive a contact of a first type and to hold the contact of the first type in direct contact with a corresponding contact of the first type in an opposing module block; and
    an adaptation component which is designed to be removably received in one of the plurality of contact receptacles of the module block in place of the contact of the first type to adapt the contact receptacle to insertably receive a contact of a second type, which has a smaller cross-section than the contact of the first type,
    wherein the adaptation component is configured to hold the contact of the second type in direct contact with a corresponding contact of the second type in the opposing module block, and
    wherein the contact of the first type and the adaptation component are interchangeably receivable at a same section of the contact receptacle.

2. The module system according to claim 1, wherein the contact of the first type is a pneumatic contact.

3. The module system according to claim 1, wherein the contact of the second type is an electrical and/or an optical contact.

4. The module system according to claim 1, wherein the adaptation component is a sleeve having an inner contour and an outer contour, wherein the inner contour is designed to fixate the contact of the second type in the adaptation component and the outer contour is designed to fixate the adaptation component in one of the plurality of contact receptacles of the module block.

5. The module system according to claim 1, wherein the adaptation component is designed for contacting the contact of the second type and for contacting a mating connector of the modular plug connector.

6. The module system according to claim 1, wherein the adaptation component is designed for releasably fixating the adaptation component in one of the plurality of contact receptacles of the module block.

7. The module system according to claim 6, wherein the adaptation component is configured such that releasing the fixated adaptation component from the contact receptacle includes deforming the adaptation component, which is blocked by a contact of the second type which has been received in the adaptation component.

8. A modular plug connector comprising the module system according to claim 1, a contact of the first type and a contact of the second type,
    wherein the contact of the first type is received in one of the plurality of contact receptacles of the module block,
    wherein the adaptation component is received in another one of the plurality of contact receptacles of the module block, and
    wherein the contact of the second type is received in the adaptation component.

9. A method of preparing a modular plug connector, comprising:
    providing a module block, wherein the module block is designed with a plurality of contact receptacles each of which is provided to insertably receive a contact of a first type and to hold the contact of the first type in direct contact with a corresponding contact of the first type in an opposing module block,
    providing an adaptation component which is designed to be removably received in one of the plurality of contact receptacles of the module block in place of the contact of the first type to adapt the contact receptacle to insertably receive a contact of a second type, which has a smaller cross-section than the contact of the first type, wherein the adaptation component is configured to hold the contact of the second type in direct contact with a corresponding contact of the second type in the opposing module block, and wherein the contact of the first type and the adaptation component are interchangeably receivable at a same section of the contact receptacle,
    inserting the contact of the first type into one of the contact receptacles of the module block,
    inserting the contact of a second type into the adaptation component,
    inserting the adaptation component into another one of the contact receptacles of the module block, and
    inserting the module block into the modular plug connector.

10. A method of producing contact, comprising:
    preparing a first and a second modular plug connector, in each case according to the method according to claim 9, and
    connecting the first and second plug connectors with respective contacting of the contacts of the first type with each other and the contacts of the second type with each other.

11. The method of claim 9, wherein the adaptation component is a sleeve having an inner contour and an outer contour, wherein the inner contour is designed to fixate the contact of the second type in the adaptation component and the outer contour is designed to fixate the adaptation component in the another one of the contact receptacles of the module block.

* * * * *